US008091646B2

(12) United States Patent
Quintero et al.

(10) Patent No.: US 8,091,646 B2
(45) Date of Patent: *Jan. 10, 2012

(54) SINGLE PHASE MICROEMULSIONS AND IN SITU MICROEMULSIONS FOR CLEANING FORMATION DAMAGE

(75) Inventors: Lirio Quintero, Houston, TX (US);
Thomas A. Jones, Cypress, TX (US);
David E. Clark, Humble, TX (US);
Allen D. Gabrysch, Houston, TX (US);
Ana Forgiarini, Merida (VE);
Jean-Louis Salager, Merida (VE)

(73) Assignee: Baker Hughes Incorporated, Houston, TX (US)

( * ) Notice: Subject to any disclaimer, the term of this patent is extended or adjusted under 35 U.S.C. 154(b) by 55 days.

This patent is subject to a terminal disclaimer.

(21) Appl. No.: 12/146,647

(22) Filed: Jun. 26, 2008

(65) Prior Publication Data
US 2009/0008091 A1 Jan. 8, 2009

Related U.S. Application Data

(60) Provisional application No. 60/947,870, filed on Jul. 3, 2007.

(51) Int. Cl.
*E21B 37/00* (2006.01)
(52) U.S. Cl. ..................................... 166/312; 166/305.1
(58) Field of Classification Search ......................... None
See application file for complete search history.

(56) References Cited

U.S. PATENT DOCUMENTS

| | | | |
|---|---|---|---|
| 3,504,744 A | 4/1970 | Davis, Jr. et al. | |
| 3,983,940 A * | 10/1976 | Carpenter et al. | ......... 166/270.1 |
| 4,017,405 A | 4/1977 | Holm | |
| 4,125,156 A | 11/1978 | Glinsmann | |
| 5,830,831 A * | 11/1998 | Chan et al. | ..................... 507/211 |
| 6,581,687 B2 | 6/2003 | Collins et al. | |
| 6,593,279 B2 * | 7/2003 | Von Krosigk et al. | ........ 507/267 |
| 6,613,720 B1 | 9/2003 | Feraud et al. | |

(Continued)

FOREIGN PATENT DOCUMENTS
WO WO0100747 A 1/2001
(Continued)

OTHER PUBLICATIONS

J. Harrison; "Microemulsion Technology for Surfactants," Specialty Chemicals Magazine, Nov. 2004, pp. 32, 34, 36.

(Continued)

*Primary Examiner* — Angela M DiTrani
(74) *Attorney, Agent, or Firm* — Mossman Kumar & Tyler PC

(57) ABSTRACT

Single phase microemulsions (SPMEs) and in situ-formed microemulsions may be used to clean up and remove non-polar materials from reservoir production zones of oil and gas wells. This clean up occurs by solubilization of the non-polar material into the microemulsion when the treatment fluid contacts the non-polar material. An in situ microemulsion may be formed when one or more surfactant and a polar phase (e.g. water or brine), and eventually some small amount of organic phase, contacts the reservoir formation and solubilizes the non-polar material encountered in the porous media. The microemulsions are effective for removing the formation damage caused by non-polar materials which include, but are not necessarily limited to oil-based mud, synthetic-based mud, paraffins, asphaltenes, emulsions, slugs, and combinations thereof.

16 Claims, 4 Drawing Sheets

Results of Return of Permeability Test

U.S. PATENT DOCUMENTS

| | | | |
|---|---|---|---|
| 6,672,388 | B2 | 1/2004 | McGregor et al. |
| 6,989,354 | B2 | 1/2006 | Thaemlitz et al. |
| 7,134,496 | B2 * | 11/2006 | Jones et al. ............ 166/278 |
| 7,238,647 | B2 | 7/2007 | Hayet et al. |
| 2003/0166472 | A1 | 9/2003 | Pursley et al. |
| 2004/0063795 | A1 * | 4/2004 | VonKrosigk et al. ........ 516/38 |
| 2006/0073986 | A1 * | 4/2006 | Jones et al. ............ 507/129 |
| 2006/0096757 | A1 * | 5/2006 | Berry et al. ............ 166/291 |
| 2006/0211593 | A1 | 9/2006 | Smith et al. |
| 2006/0258541 | A1 | 11/2006 | Crews |
| 2007/0295368 | A1 * | 12/2007 | Harrison et al. ........... 134/42 |

FOREIGN PATENT DOCUMENTS

| | | | |
|---|---|---|---|
| WO | WO2006051255 | * | 5/2006 |
| WO | 2006109016 | A1 | 10/2006 |

OTHER PUBLICATIONS

PCT/US2008/068475; International Search Report and Written Opinion, Nov. 6, 2008. [corresponding PCT International application].

M. Miñana-Perez, et al., "Solubilization of Polar Oils with Extended Surfactants," Colloids and Surfaces A: Physicochemical and Engineering Aspects, 1995, pp. 217-224, vol. 100.

M. Miñana-Perez, et al., "Solbilization of Polar Oils in Microemulsion Systems," Progr. Colloid Polym. Sci., 1995, pp. 177-179, vol. 98.

J. Salager, et al., "Chapter 8: Ionic Microemulsions," P.Kumar, et al. Handbook of Microemulsion Science and Technology, 1999, pp. 247-280, Marcel Dekker, New York.

J. L. Salager, et al., "Enhancing Solubilization in Microemulsions—State of the Art and Current Trends," Journal of Surfactants and Detergents, Jan. 2005, pp. 3-21, vol. 8, No. 1.

G. Penny, et al., "The Application of Microemulsion Additives in Drilling and Stimulation Results in Enhanced Gas Production," SPE 94274, 2005 SPE Production and Operations Symposium, Apr. 17-19, 2005, pp. 1-9, Oklahoma City, Oklahoma.

L. Quintero, et al., "One-Step Acid Removal of an Invert Emulsion," SPE 94604, SPE 6th European Formation Damage Conference, May 25-27, 2005, pp. 1-9, Scheveningen, The Netherlands.

J. L. Salager, et al., "Amphiphilic Mixtures versus Surfactant Structures with Smooth Polarity Transition across Interface to Improve Solubilization Performance", CESIO 2008—7th World Surfactant Congress Paris, Jun. 22-25, 2008, pp. 1-9.

* cited by examiner

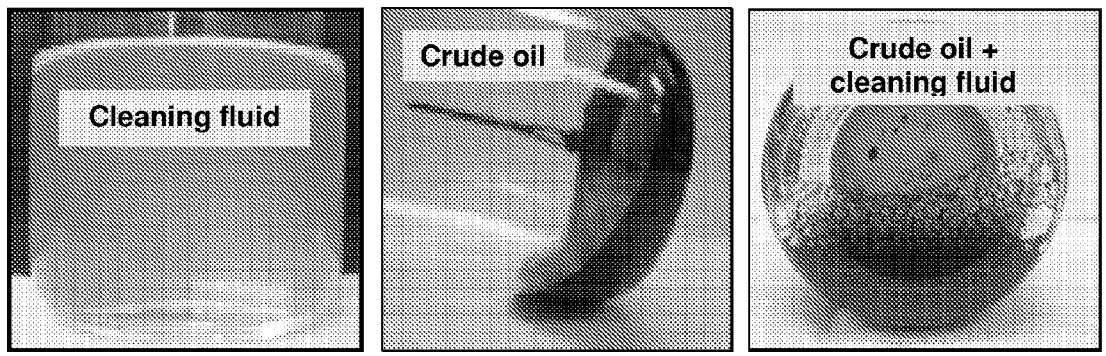
FIG. 3A     FIG. 3B     FIG. 3C
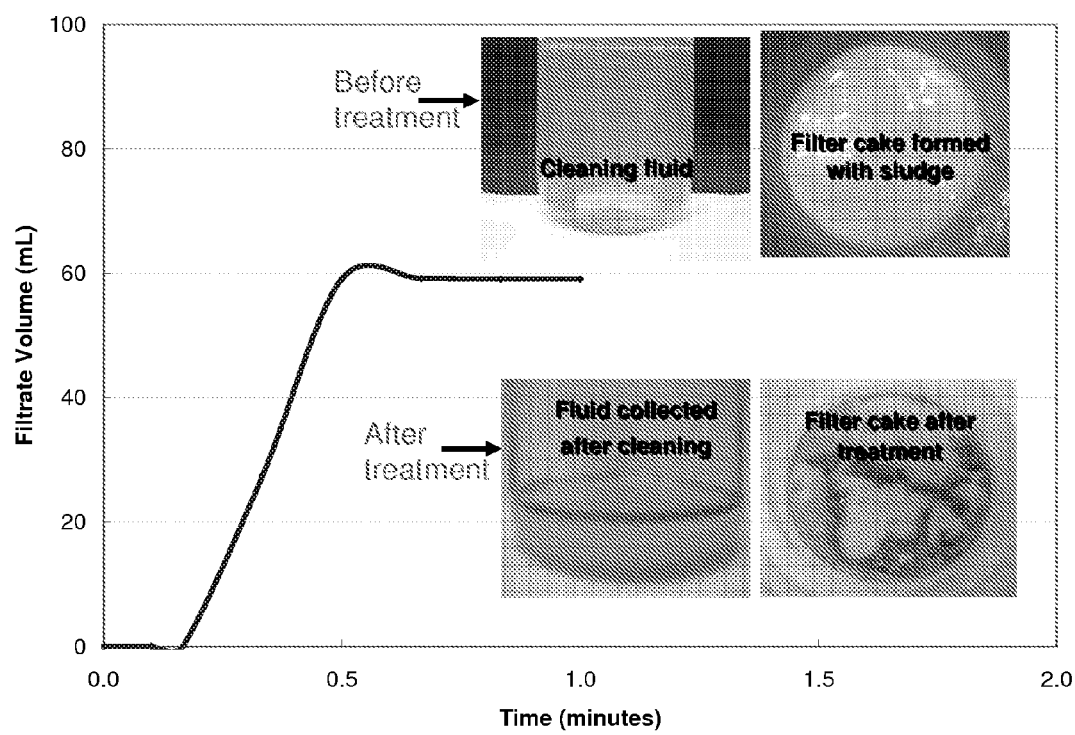
FIG. 4 – Result of Cleaning Test in HPHT Cell

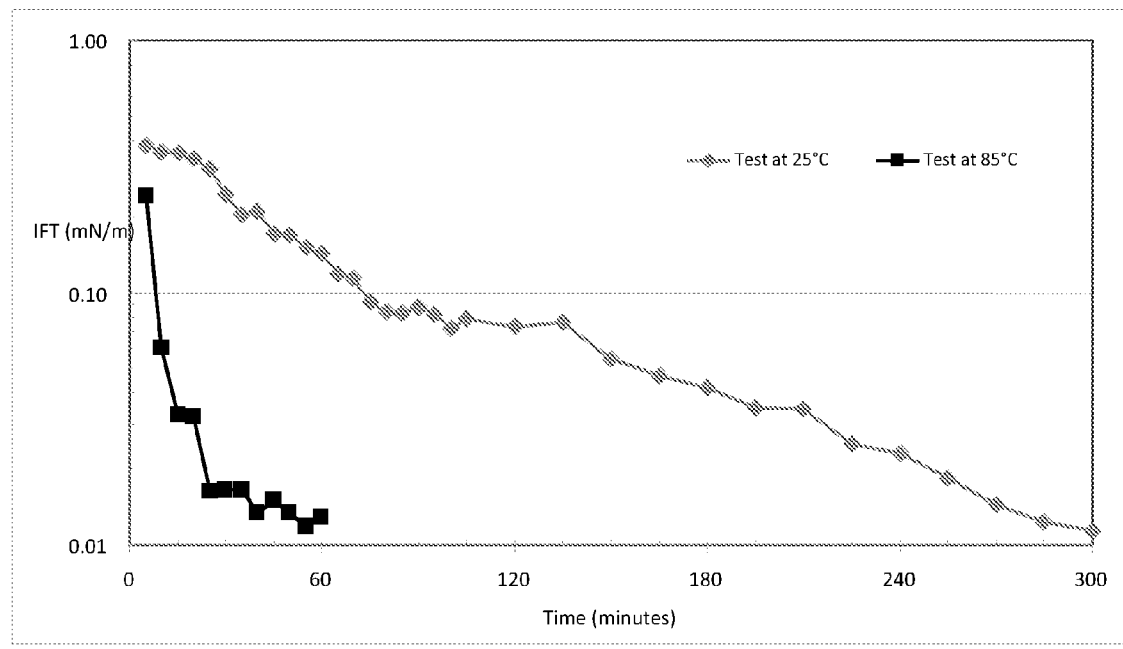
FIG. 5 – Interfacial Tension Between the Crude Oil and Treatment Fluid
FIG. 6A
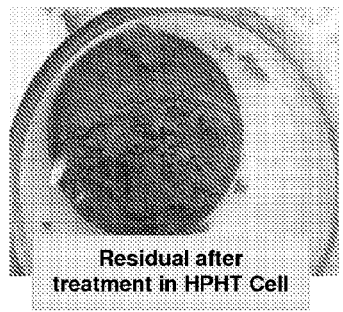
FIG. 6B
FIG. 6C

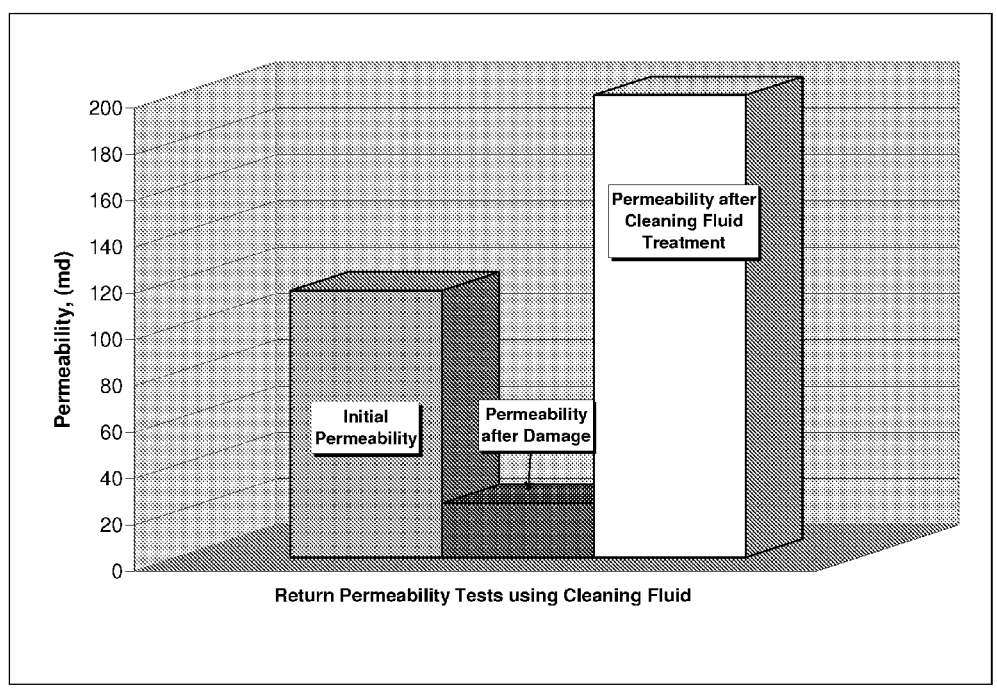
FIG. 7 – Results of Return of Permeability Test

SINGLE PHASE MICROEMULSIONS AND IN SITU MICROEMULSIONS FOR CLEANING FORMATION DAMAGE

CROSS-REFERENCE TO RELATED APPLICATIONS

This application claims the benefit of U.S. Provisional Application No. 60/947,870 filed Jul. 3, 2007, and is a continuation-in-part application of U.S. Ser. No. 11/866,486 filed Oct. 3, 2007.

TECHNICAL FIELD

The present invention relates to methods and compositions for reducing or removing non-polar materials and damage they cause in subterranean reservoirs, and more particularly relates, in one non-limiting embodiment, to methods and compositions for reducing or removing non-polar materials and damage caused thereby from subterranean reservoir using microemulsions.

BACKGROUND

Formation damage involves undesirable alteration of the initial characteristics of a producing formation, typically by exposure to drilling fluids. The water or solid particles in the drilling fluids, or both, tend to decrease the pore volume and effective permeability of the producible formation in the near-wellbore region. There may be at least three possible mechanisms at work. First, solid particles from the drilling fluid may physically plug or bridge across flowpaths in the porous formation. Second, when water contacts certain clay minerals in the formation, the clay typically swells, thus increasing in volume and in turn decreasing the pore volume. Third, chemical reactions between the drilling fluid and the formation rock and fluids may precipitate solids or semisolids that plug pore spaces.

Reduced hydrocarbon production can result from reservoir damage when a drilling mud deeply invades the subterranean reservoir. It will also be understood that the drilling fluid, e.g. oil-based mud, is deposited and concentrated at the borehole face and partially inside the formation. Many operators are interested in improving formation clean up and removing the cake or plugging material or improving formation damage after drilling into reservoirs with OBMs.

Drilling fluids used in the drilling of subterranean oil and gas wells along with other drilling fluid applications and drilling procedures are known. In rotary drilling there are a variety of functions and characteristics that are expected of drilling fluids, also known as drilling muds, or simply "muds".

Drilling fluids are typically classified according to their base fluid. In water-based muds, solid particles are suspended in water or brine. Oil can be emulsified in the water which is the continuous phase. Brine-based drilling fluids, of course are a water-based mud (WBM) in which the aqueous component is brine. Oil-based muds (OBM) are the opposite or inverse. Solid particles are suspended in oil, and water or brine is emulsified in the oil and therefore the oil is the continuous phase. Oil-based muds can be either all-oil based or water-in-oil macroemulsions, which are also called invert emulsions. In oil-based mud, the oil may consist of any oil that may include, but is not limited to, diesel, mineral oil, esters, or alpha-olefins. OBMs as defined herein also include synthetic-based fluids or muds (SBMs) which are synthetically produced rather than refined from naturally-occurring materials. SBMs often include, but are not necessarily limited to, olefin oligomers of ethylene, esters made from vegetable fatty acids and alcohols, ethers and polyethers made from alcohols and polyalcohols, paraffinic, or aromatic, hydrocarbons alkyl benzenes, terpenes and other natural products and mixtures of these types.

It would be desirable if compositions and methods could be devised to aid and improve the ability to clean up formation damage, and to remove it more completely and easily, without causing additional damage to the formation.

SUMMARY

There is provided, in one non-limiting form, a method of removing at least a portion of non-polar material from a subterranean reservoir. The method involves pumping a cleaning fluid into a subterranean reservoir that contains non-polar material to contact the cleaning fluid with the non-polar material. The cleaning fluid may include a single-phase microemulsion (SPME), which in turn includes at least one surfactant, at least one non-polar fluid, and at least one polar fluid. Alternatively, the fluid may include an in situ-produced microemulsion or any kind of emulsion-forming components which comprise at least one surfactant and at least one polar fluid. In this latter case, a microemulsion is formed when the at least one surfactant and the polar fluid contacts the non-polar material. At least part of the non-polar material is incorporated into either the SPME and/or an in situ-formed emulsion, including nanoemulsions, microemulsions, macroemulsions (standard emulsions) or miniemulsions in the subterranean reservoir. The method further involves removing the emulsion incorporating the non-polar material from the subterranean reservoir. This method at least partially removes and/or remediates the formation damage.

An acid may be optionally used to solubilize the contaminant solid particles in the formation. The acid may be a mineral acid and/or an organic acid, and in one non-limiting embodiment may be a polyamino carboxylic acid (PACA). Oxidizing agents, water-soluble enzymes (e.g. catalysts), barite dissolvers (e.g. chelants), and combinations thereof may also be used in the fluids herein. Precursors to these components may also be employed, in other words, these additional components may be generated or activated in situ in the subterranean reservoir and/or downhole.

The microemulsions of this method may involve thermodynamically stable, macroscopically homogeneous, single phase microemulsions that include a polar phase, a nonpolar phase, a surfactant, and optionally a co-surfactant and acid.

BRIEF DESCRIPTION OF THE DRAWINGS

FIG. 3A is a photograph of a microemulsion cleaning fluid herein used in Example 1;

FIG. 3B is a photograph of crude oil used in Example 1;

FIG. 3C is a photograph of the microemulsion cleaning fluid shown in FIG. 3A in contact with the crude oil of FIG. 3B;

FIG. 4 is a graph of the results of the cleaning test in a HPHT cell of Example 2 plotting filtrate volume as a function of time, along with a photograph of a microemulsion cleaning fluid before treatment and a filter cake formed with sludge, compared to photographs of the fluid collected after treatment and the filter cake after treatment;

FIG. 5 is a graph of the interfacial tension between the crude oil and treatment fluid as a function of time for two different temperatures, 25° C. and 85° C.;

FIG. 6A is a photograph of a filter cake formed with sludge from an oil field, on a disc used in Example 3;

FIG. 6B is a photograph of the filter cake of FIG. 6A after treatment with a microemulsion in a HPHT cell;

FIG. 6C is a photograph of the filter cake of FIG. 6B after the disc had been rinsed with water; and FIG. 7 is a bar graph showing the results of the return permeability test of Example 4.

DETAILED DESCRIPTION

Figure 1:
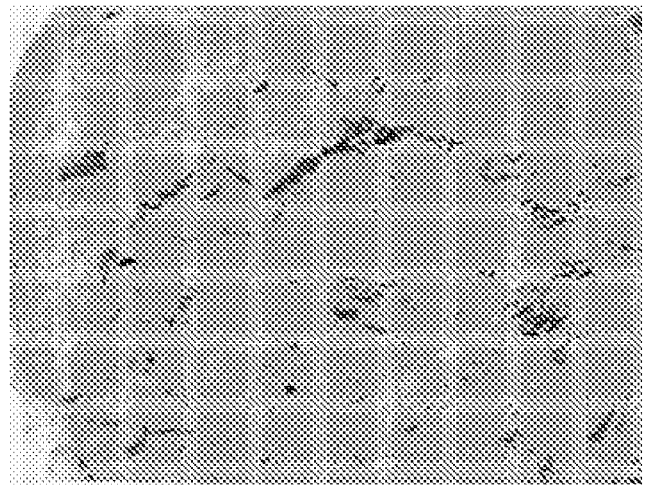
FIG. 1 is a photograph of typical OBM filter cake appearance after mud-off on a 20 μm ceramic disc before soaking with a bi-continuous microemulsion.

It has been discovered that subterranean reservoir formation damage caused by non-polar materials, including but not necessarily limited to, oil-based mud, synthetic-based mud, paraffins, asphaltenes, slugs, emulsions, and combinations thereof may be removed, healed, restored or otherwise remediated, and that these non-polar materials may also be removed, using microemulsions. Slugs are extremely high viscous fluids formed under dynamic condition when crude oil or OBM contacts aqueous fluids that contains certain additives that could target emulsification and trapped solids. The microemulsions may be single phase microemulsions (SPMEs) formed prior to pumping to the subterranean reservoir, or the microemulsions may be formed in situ in the subterranean reservoir or an injected microemulsion could form a new microemulsion incorporating non-polar and polar fluids and particles already present in the formation. This improved clean up method occurs by solubilization of the non-polar material and eventually polar material into the microemulsion when the treatment fluid contacts the non-polar material. An in situ microemulsion may be formed when one or more surfactant and a polar phase (e.g. water) contacts the reservoir formation and solubilizes the non-polar material encountered in the porous media. That is, by "eventually" it is meant herein that the non-polar material and surfactant at some point later in time, such as downhole or separately added, contacts a polar fluid, such as reservoir fluids, or a fluid of intermediate polarity, such as a separately added alcohol or cosurfactant. By "eventually" it is meant that the contact is not necessary or compulsory, but that such eventual contact may not be ruled out. For instance, in order to make a microemulsion it is not always necessary to add an alcohol co-surfactant, but in some instances (e.g. when employing ionic surfactants at low temperature) it is almost necessary or at least it makes things easier.

In the methods and compositions herein, the clean up may be accomplished by changing the OBM and other non-polar materials into a microemulsion (Winsor III) and/or single phase microemulsion, such as Winsor IV or similar chemistry, as will be described later in more detail. Single phase microemulsions may be defined as bi-continuous phases formed by oil and water. In one non-limiting explanation of the phenomenon, a single phase microemulsion contacts the oil-based mud and other non-polar materials and forms a water continuous (oil-in-water) microemulsion. It has been surprisingly discovered that this contacting may be accomplished without circulating the well, by which is meant pumping fluid through the whole active fluid system, including the borehole and all the surface tanks that constitute a primary system. That is, the fluid with the pre-formed SPME is pumped into the formation or subterranean reservoir and allowed to soak the non-polar materials present, with the mixing taking place by diffusion. In other non-limiting embodiments, it may be helpful to circulate the fluid to remove surface damage before pumping the pre-formed SPME into the formation or subterranean reservoir. It has also been discovered that the microemulsion may be formed in situ downhole. That is, it is not necessary to form the microemulsion on the surface and pump it downhole. As noted, the literature generally describes these microemulsions as single phase microemulsions, referred to as Winsor IV case of phase behavior, but the present method includes the use of three-phase systems in which the microemulsion is in equilibrium with an excess of one or both the polar phase (brine) and non-polar phase (oil), which is usually referred to as the Winsor III case of phase behavior.

More specifically, the methods and compositions herein involve using an in situ-formed fluid such as a microemulsion for removing oil-based mud (OBM) or synthetic oil-based mud (SBM), and reversing the wettability and removing or minimizing formation damage in the subterranean reservoirs of oil or gas wells drilled with SBMs or OBMs. The in situ fluid (e.g. microemulsion, nanoemulsion, etc.) may be formed when at least one surfactant and a polar phase (usually, but not limited to water or brine) contacts the OBM or other non-polar materials and solubilizes the non-polar material of the OBM. It should be understood herein that the term OBM encompasses SBMs.

One of the benefits of the in situ fluid formation of the microemulsion is that the cleaning fluid does not require any additional oil or solvent in the formulation, or at least much less than the proportion that could be solubilized in the final microemulsion, which gives a higher capacity for oil or non-polar material incorporation or cleaning capability when contacted with the OBM and other non-polar materials. Another benefit is that any particles or other oil-wet contamination turn from oil-wet to water-wet. Additionally, water-wetting improves damage remediation (including, but not limited to, filter cake destruction) when mineral acids, organic acids, oxidizing agents, water-soluble enzymes (e.g. catalysts), or precursors of these components (e.g. in situ acid generators) are spotted into a subterranean reservoir after or during the wettability reversal process, because it favors the contact between the acid and the particles. As the OBM (or SBM) is contacted and absorbed and/or the oil-wet, non-polar materials are converted from oil-wet to water-wet during the in situ formation of a fluid, such as a microemulsion or nanoemulsion or precursors of them, the blend of surfactants and a polar phase (e.g. water) may also contain acids, barite dissolvers (chelants) or other precursor additives that can dissolve the acid-soluble particles or dissolve the barite and other particulates and also break down any polymeric fluid loss additive (if present). In many cases, the surfactant may be a surfactant blend and is often a surfactant and co-surfactant mixture, in which the co-surfactant is a short amphiphilic substance such as an alcohol (in non-limiting examples, propanol, butanol, pentanol in their different isomerization structures) as well as glycols, and ethoxylated and propoxylated alcohols or phenols. Alcohols are also noted herein as substances of intermediate polarity; that is, intermediate between non-polar substances such as oils and polar substances such as water.

In one non-limiting embodiment, the in situ-formed emulsion may be made using a surfactant, a polar fluid and a relatively small amount of non-polar fluid and/or fluid of intermediate polarity. It has been found that it is sometimes helpful when forming an in situ emulsion downhole to inject a water solution of surfactant already containing some solubilized oil (in a non-restrictive example only from about 2 to about 40% or so). In other words, the injected fluid may be considered as a single phase microemulsion containing only 2% of oil, and then once in the reservoir this fluid will solubilize the oil which is in situ and thus becomes another single phase microemulsion containing much more oil, in a non-limiting instance, about 70 or 80%.

The use of this in situ fluid (e.g. single phase microemulsion) chemistry in reservoir cleaning optionally allows the direct contact of a chelating agent, such as an acid and/or an acid blend mixed in conventional brine completion fluids (or generated in situ), without causing a high viscosity oil continuous emulsion (sludge) and formation blockage. The action of the single phase microemulsion, e.g., alters the non-polar materials present, which allows a chelating agent (if present) such as an acid or a salt of an acid, such as a polyamino carboxylic acid (PACA) or polylactic acid and/or a mineral acid or salt thereof, e.g. hydrochloric acid or an organic acid or salt thereof, e.g. acetic acid, or other acid, to solubilize the formation and/or particles that may be present, such as calcium carbonate, hematite, ilmenite, and barite. Particles composed of manganese tetroxide (in one non-limiting embodiment) may be treated with an in situ fluid (e.g. a single phase microemulsion, containing an acid or acid blend) providing the acid is an organic acid in one non-limiting embodiment. It has been found that PACAs perform relatively better in an alkaline environment as the salt of these acids, which further differentiates them from the more common acids and salts thereof.

For instance a salt of PACA dissociates barium sulfate from the calcium carbonate treated; the PACA takes on the cation. In a non-limiting example, a Na or K salt of PACA when contacting calcium carbonate contacts and dissolves the barium salt through cation exchange. The salt forms of PACAs perform relatively better than the plain acid form, but the undissociated acid form still performs the functions and achieves the desired results of the methods and compositions herein. The plain acid form works somewhat better at relatively low pH.

The net effect of such a treatment system will improve an operator's chance of injecting water in a reservoir to maintain reservoir pressure (for example, for injection wells), and improve production rates in producing wells. In either case, non-polar material alteration is accomplished by creating the in-situ fluid (e.g. single phase microemulsion) across the injection/production interval or pumping the pre-formed SPME into the formation.

In brief, one non-limiting embodiment OBM material clean up technology herein, also referred to as "one-step" clean up, utilizes preformed SPMEs and/or in situ single phase microemulsion, e.g., and optional chelating agent techniques in a single blend to change the oil or invert emulsion of an OBM or other non-polar materials to a microemulsion (or in other in situ fluid) and simultaneously decompose its acid soluble components. Altering the non-polar materials using a pre-formed SPME or an in situ single phase microemulsion (or in other in situ formed fluid) facilitates the elimination of these non-polar materials and oil-wet solids as solubilized in the aqueous solution component of the in situ fluid thus preventing the occurrence of a sludge that could form.

It will be appreciated that it is not necessary for all of the non-polar materials and all of the oil-wet contaminant particles to be removed from a subterranean reservoir for the method and its compositions herein to be considered successful. Success is obtained if more non-polar materials and/or more particles are removed using the microemulsions herein, whether not formed in situ (e.g. single phase microemulsion) than if it is not used, or if more non-polar materials and/or particles are removed using the microemulsions together with a chelating agent, as compared to the case where no microemulsions and/or chelating agents are used. Alternatively, the methods and compositions are considered successful if at least a portion of the non-polar materials are removed. In one non-limiting embodiment at least a majority (>50%) of the non-polar materials are removed. In general, of course, it is desirable to remove as much of the OBM, non-polar materials, contaminants and other particulates as possible. One non-restrictive goal of the methods and compositions herein is to remove non-polar material and oil-wet particles to obtain a high percentage of water injection (in a non-limiting instance, >50% increase in the injection rate) or higher percentage of oil and gas production (e.g. >50%) as compared to the expected production in the case where no microemulsion is used whatsoever.

The subterranean reservoir clean up technology described herein has a wide range of applications. By combining the chemical aspect of wellbore clean up with displacement techniques, it is believed that subterranean reservoir disadvantages after drill-in with OBMs (e.g. invert emulsion fluids) may be significantly reduced or eliminated.

Drilling a well with WBMs may also cause formation damage. For instance, the formation damage caused by WBM includes, but is not necessarily limited to, in-situ water or brine-in-crude oil emulsions, and solids invasion. The water and/or the particles may tend to decrease the pore volume and effective permeability of the formation, and the water may additionally swell certain clay minerals that may be present.

The methods and compositions herein may be used to remove, heal, and/or remediate damage caused by deposits of macromolecules from crude oils, such as the case of deposition of asphaltenes in the reservoir porous media. Other damage that may be removed includes any emulsions that incorporate or include any non-polar material (oil and other hydrocarbons) from the reservoir, or introduced in the drilling mud, as well as other substances injected downhole.

Thus, the methods and compositions herein have the advantages of reduced formation damage, and consequently increased hydrocarbon recovery, and/or increased water injection rate, as compared with an otherwise identical method and composition without microemulsions (in situ or otherwise), e.g. single phase microemulsions and/or the single phase microemulsion including an acid or other component. Microemulsions are thermodynamically stable, macroscopically homogeneous mixtures of at least three components: a polar phase and a nonpolar phase (usually, but not limited to, water and organic phase) and at least one surfactant, often more than one surfactant, for instance with a co-surfactant such as an alcohol, particularly when ionic surfactants are used, as mentioned in the reference: J. L. Salager and R. E. Anton, "Ionic Microemulsions", Chapter 8, in P. Kumar and K. L. Mittal, ed. *Handbook of Microemulsion Science and Technology*, Marcel Dekker Inc. New York 1999, pp. 247-280. Suitable co-surfactants include, but are not necessarily limited to, mono or poly-alcohols, low molecular weight organic acids or amines, polyethylene glycol, low ethoxylation solvents such as butoxyethanol and the like, and mixtures thereof. Microemulsions form spontaneously and differ markedly from the thermodynamically unstable macroemulsions, which depend upon intense mixing energy for their formation. Microemulsions are well known in the art, and attention is respectfully directed to S. Ezrahi, A. Aserin and N. Garti, "Chapter 7: Aggregation Behavior in One-Phase (Winsor IV) Microemulsion Systems", in P. Kumar and K. L. Mittal, ed., *Handbook of Microemulsion Science and Technology*, Marcel Dekker, Inc., New York, 1999, pp. 185-246.

The referenced chapters describe the types of microemulsion phase behavior defined by Winsor: Winsor I, Winsor II and Winsor III. A system or formulation is defined as: Winsor I when it contains a microemulsion in equilibrium with an excess oil phase; Winsor II when it contains a microemulsion in equilibrium with excess water; and Winsor III when it contains a middle phase microemulsion in equilibrium with excess water and excess oil. The author also describes Winsor IV as a single-phase microemulsion, with no excess oil or excess water. Although not wishing to be limited by any one theory, it is believed that the microemulsions formed in the methods and compositions herein are of the Winsor IV type, which means the entire system is a microemulsion phase at least at first and somewhere in the process, with the possibility of ending with one or two excess phases as the injected formulation is diluted by the reservoir fluids. That is, the original single phase microemulsion, a Winsor I or II may expel some excess phase and become a Winsor III system with the same microemulsion and properties. The thermodynamically stable single phase Winsor IV microemulsion could evolve by a change in formulation or composition into the formation of a miniemulsion or nanoemulsion, which is a two-phase system either Winsor I or Winsor II with submicron size droplets which could be stable for long period of time, but not permanently stable as a microemulsion, as explained in reference J. L. Salager, "Emulsion Phase Inversion Phenomena" in *Emulsions and Emulsion Stability*, J. Sjöblöm Ed., 2$^{nd}$ Edition, Chap. 4, pp. 185-226, Taylor and Francis, London (2006).

Surfactants suitable for creating the in situ fluids (e.g. single phase microemulsions) herein include, but are not necessarily limited to non-ionic, anionic, cationic and amphoteric surfactants and in particular, blends thereof. Co-solvents or co-surfactants such as alcohols are optional additives used in the microemulsion formulation. Suitable nonionic surfactants include, but are not necessarily limited to, alkyl polyglycosides, sorbitan esters, polyglycol esters, methyl glucoside esters, or alcohol ethoxylates. Suitable anionic surfactants include, but are not necessarily limited to, alkali metal alkyl sulfates, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulphosuccinates, alkyl ether sulfates, linear and branched ether sulfates, and mixtures thereof. Suitable cationic surfactants include, but are not necessarily limited to, arginine methyl esters, alkanolamines and alkylenediamines. In one non-limiting embodiment at least two surfactants in a blend may be used to create single phase microemulsions in situ, as well as the other in-situ fluids. Suitable surfactants may also include so-called extended surfactants containing a non-ionic spacer-arm central extension and an ionic or nonionic polar group. The non-ionic spacer-arm central extension may be the result of polypropoxylation, polyethoxylation, or a mixture of the two, in non-limiting embodiments.

In another non-restrictive embodiment, the SPME and in situ fluid formulation (e.g. macroemulsion, nanoemulsion, etc.) may contain a co-surfactant which may be an alcohol having from about 3 to about 10 carbon atoms, in another non-limiting embodiment from about 4 to about 6 carbon atoms. A specific example of a suitable co-surfactant includes, but is not necessarily limited to butanol. These co-surfactants may be alkoxylated, e.g. ethoxylated and/or propoxylated, although in most cases sufficient ethoxylation should be present to accomplish the purposes of the methods herein. In one non-restrictive embodiment the number of ethoxy units ranges from about 3 to about 15, alternatively from about 6, independently up to about 10.

In one non-restrictive version, an optional co-surfactant may be employed. The proportion of co-surfactant to be used with the surfactant is difficult to specify in advance and may be influenced by a number of interrelated factors including, but not necessarily limited to, the nature of the surfactant, the nature of the co-surfactant, the type of drilling fluid being removed, displaced or otherwise affected, wellbore conditions, and the like. In one non-limiting embodiment, a fluid to be pumped includes a surfactant blend of polyethoxylated alkyl sulfate and polyglycerol ester (such as PG 8-10 ester available from Oleon N.V.) that has a molar ratio of free OH/esterified OH of 3.4/1, optionally with an alkyl alcohol ethoxylated with 7.5 or higher EO.

In one non-limiting embodiment herein, the SPME or in situ-formed emulsion contains a non-polar liquid, which may include a synthetic fluid including, but not necessarily limited to, ester fluids; paraffins (such as PARA-TEQ™ fluids from Baker Hughes Drilling Fluids) and isomerized olefins (such as ISO-TEQ™ from Baker Hughes Drilling Fluids). However, diesel and mineral oils such as Escaid 110 (from Exxon) or ECD 99-DW oils (from TOTAL) can also be used as a non-polar liquid in preparing the fluid systems of herein. Other suitable non-polar liquids include, but are not necessarily limited to, limonene, pinene and other terpenes, xylene, mutual solvents, and the like. As noted previously, an advantage of forming the active formula (e.g. nanoemulsion, single phase microemulsion, etc.) in situ is that less non-polar liquid needs to be used (as compared with a pre-formed microemulsion) since all or most of the non-polar liquid is found in the non-polar materials, OBM (or SBM) itself. This gives a higher capacity for the microemulsion, e.g., to solubilize the oil and other substances of the non-polar materials.

It will be appreciated that the amount of in situ fluid to be created or formed and the amounts of in situ-forming components (polar, nonpolar and a surfactant and co-surfactant, if present) to be added or included are difficult to determine and predict in advance or in general with much accuracy since it is dependent upon a number of interrelated factors including, but not necessarily limited to, the brine type, the OBM or SBM type, the temperature of the formation, the particular surfactant or surfactant blend used, whether a chelating agent or acid is present and what type, etc. Nevertheless, in order to give some idea of the quantities used, in one non-limiting embodiment, the proportion of non-brine components in the in situ fluid (e.g. single phase microemulsion) may range from about 15 to about 85 volume %, even about 90 volume %, and in other non-limiting embodiments may range from about 1 to about 20 volume % in a diluted microemulsion, sometimes called micellar solutions, and from about 70 to about 95 volume % in another diluted microemulsion, sometimes called an inverse micellar solution.

It is expected that brine will be a common component of the in situ fluid (e.g. single phase microemulsion), and any of the commonly used brines, and salts to make them, are expected to be suitable in the compositions and methods herein. Although water is expected to be the polar liquid used to make the microemulsions in situ, it will be appreciated that other polar liquids such as alcohols and glycols, alone or together with water, may be used.

In the non-limiting embodiment where the in situ fluid (e.g. single phase microemulsion) contains at least one chelating agent, the chelating agent should be capable of solubilizing or dissolving at least some of the particulate materials present. The chelating agent may be one or more inorganic acids or salts thereof including, but not necessarily limited to, hydrochloric acid, sulfuric acid, and/or organic acids including, but not necessarily limited to, an organic agent or salt thereof, e.g. acetic acid, formic acid and mixtures thereof. In one non-limiting embodiment, the acid may be only one mineral acid or only one organic acid.

In most embodiments, the in situ fluid may contain at some point a chelating agent such as polylactic acid and/or a polyamino carboxylic acid (PACA) of the acrylic or maleic type, or carboxylated polysaccharides, or a salt of PACA. Suitable PACAs and other chelating agents include, but are not necessarily limited to, nitrilotriacetic acid (NTA), ethylenediamine tetraacetic acid (EDTA), trans-1,2-diaminocyclohexane-N,N,N',N',-tetraacetic acid monohydrate (CDTA), diethylenetriamine pentaacetic acid (DTPA), dioxaoctamethylene dinitrilo tetraacetic acid (DOCTA), hydroxyethylethylenediamine triacetic acid (HEDTA), triethylenetetramine hexaacetic acid (TTHA), trans-1,2-diaminocyclohexane tetraacetic acid (DCTA), tripolyphosphates, polyphosphates, pyrophosphates, alpha-ether carboxylates, oxy-diacetate salts, carboxymethyl tartronate (CMT) and carboxymethyl oxy-succinate (CMOS), citric, tartaric and tartronic salts and mixtures thereof.

The concentration of chelating agent in the in situ fluid (e.g. single phase microemulsion) has a lower limit of about 1 volume %, alternatively of about 5 volume %, and an upper limit of about 30 volume %, alternatively about 20 volume %, and in another non-restrictive embodiment up to about 15 volume %.

There are various ways by which the chelating agent may be delivered according to the procedure herein. The chelating agent may be added to the pumped fluid with the components to form the single phase microemulsion, e.g., in situ; or may be added before (as a presoak) or after the in situ fluid (e.g. single phase microemulsion) treatment; or may be added to the microemulsion soak solution once it is formed in place before removing the majority of the non-polar materials and OBM (e.g. invert emulsion) and combinations thereof.

With further specificity, the methods and compositions herein may concern one-trip clean up fluids designed to physically change an OBM (e.g. an invert emulsion) and other non-polar materials and optionally acidify the acid soluble components present. The method not only physically changes the nature of the non-polar materials, the resulting oil components which are incorporated into the single phase microemulsion (e.g.) formation in situ and then further microemulsified or solubilized, allow for ease of water injection, in the case of injection wells, or ease of production through completion screens, in the case of production wells. With the conversion of the external oil to internal emulsified oil in water, plus the optional decomposition of minerals (e.g. particles e.g. calcium carbonate and other acid-soluble components) by chelating agents, most of the non-polar fluid and particulate material is either removed or micro-sized to the extent that only a minimal or reduced amount of damaging components remain in the subterranean reservoir.

In one non-limiting embodiment and in still further detail, the compositions and methods herein utilizes a microemulsion or other in situ fluid to convert an OBM and oil-wet particles to a water-based fluid and water-wet particles. The benefits of such conversions, often called inversion, are several. Non-polar materials are oil wet and pose compatibility problems for certain completion operations, such as water injection and gravel packing, whereas water-based or water-wet components are naturally compatible with injection water and brine-based gravel pack carrier fluids. Additionally, WBMs and water-wet particles are ideal for damage remediation of the subterranean reservoir when mineral acids, organic acids, oxidizing agents, water soluble enzymes (catalysts) and in situ acid generators are spotted in a wellbore after (or during) the treatment.

The in situ fluid (e.g. microemulsion) soak solution may also contain acids, barite dissolvers (chelants) or other precursor additives that can dissolve the acid-soluble particles or dissolve the barite and break down fluid loss additives (polymeric or otherwise). The value of such a conversion using a single soak solution with all its functional components is that the OBM (e.g. invert emulsion) and other non-polar materials may be converted to water-based or water-continuous materials containing dissolvable particulates and fluid loss control additives that may be removed in a single operational step.

In another non-limiting embodiment, the salts suitable for use in creating the brine include, but are not necessarily limited to, ammonium chloride, sodium chloride, potassium chloride, calcium chloride, sodium bromide, calcium bromide, sodium formate, potassium formate, cesium formate, magnesium chloride or acetate and combinations thereof. The density of the brines may range from about 8.4 lb/gal to about 15 lb/gal (about 1 to about 1.8 kg/liter), although other densities may be given elsewhere herein.

The in situ fluid (e.g. single phase microemulsion) treatment may be composed of different brine and oil blends, depending on the required density of the fluid for the well.

This technology does not require or discriminate against any invert emulsion. In other words, the single phase microemulsion may be applied to reservoir clean up for any OBM system regardless of base oil type or emulsifier used to formulate the mud. This versatility allows an operator flexibility to formulate the drilling fluid based on wellbore needs. This is not the case in some prior methods whereby highly specific amine emulsifiers are needed because they require acid protonation to reverse the wettability. In the technology herein, the chelating agent is only used for removal of acid soluble bridging components. In one non-limiting embodiment the methods and compositions are practiced in the absence of amine emulsifiers, such as rosin amines and/or amine emulsifiers of the formula $R\text{---}N\text{---}[(CH_2CH_2R'A)_xH]_2$.

Another important feature relative to other OBM, invert emulsion or other non-polar material removal methods is that the oil phase of the OBM emulsion is micro-emulsified into the single phase microemulsion (or in other in situ fluid, such as nanoemulsion, miniemulsion or single phase emulsion) by soaking, that is simple contacting, letting the diffusion produce the mixing over a time span ranging from a few minutes to a few days. The treatment process reduces the energy necessary for the microemulsion to form when compared to previous methods. This efficiency eliminates or reduces the number of pipe trips and decreases the time required to complete the well.

The invention will now be further discussed with respect to actual implementation of the invention in Examples which are not intended to limit the invention, but simply to further illustrate it. Again, while the in situ fluid may be referred to as a "microemulsion" or "single phase microemulsion", it should be appreciated that the methods and compositions are expected to apply to other in situ fluids including, but not limited to miniemulsions, nanoemulsions, and all types of microemulsions.

Objective

An objective of these Examples was to attempt to stimulate a non-producing reservoir that had been previously drilled with an invert emulsion drilling fluid. The subject reservoir was thought to have been damaged during the drill-in phase and thus was virtually a non-producer.

Laboratory stimulation tests were performed to determine if permeability could be restored after soaking damaged core samples (Berea and ceramic discs) with a bi-continuous SPME as described herein. The core was damaged by mudding off with an OBM sample. The particulates addressed in these experiments came from filter cake deposited on the core samples.

SUMMARY

Based on permeability results alone, it initially appeared that the stimulation technique applied had a limited effect (See Data Summary below). Return permeability testing after a 2-hr mud-off gave only a 47% regain permeability. However, after an inspection of the various cores, it was determined that the solids in the filter cake were in fact changed to a water-wet state and that the compacted filter cake was totally disrupted. In other words, the filter cake destruction technology seemed to do exactly what it was designed to do. The conclusion from a Return Permeability Laboratory was that the low particle size distribution (PSD), non-acid soluble and low-gravity solids content of the mud-off fluids caused irreversible damage due to plugging.

Bi-Continuous Microemulsion Technology

A considerable number of laboratory tests were performed using the bi-continuous emulsion technology described herein to verify its ability to destroy an invert emulsion filter cake for open-hole and other completion applications.

A primary emphasis was to attack an OBM or SBM filter cake with two completely separate mechanisms. The first mechanism was designed to break the invert emulsion of the filter cake using a SPME which incorporated the oil and emulsifier into the bi-continuous microemulsion soak solution. Secondly, acid was made available to decompose soluble calcium carbonate used as bridging particles.

Although the approach had two distinct mechanisms, the bi-continuous microemulsion soak solutions were designed to facilitate both destruction mechanisms simultaneously, allowing for ease of application and reduced rig time.

Of major importance was the effect that the bi-continuous microemulsion soak solutions had on the compacted nature of a SBM or OBM filter cake. After a short period of soaking (2-4 hours or longer), the filter cake particles became water-wet and "slurrified", that is, somehow loose instead of sticky and connected. In non-acid applications, the resulting filter cake particles became highly porous having little or no effect on permeability values.

The data presented below summarizes the filter cake destruction results obtained from laboratory tests using the bi-continuous emulsion technology described herein.

In the context herein, "destruction" refers to removal of the invert emulsion nature of an S/OBM filter cake, the change in wettability of the particulates to water-wet and in cases where acid is included, with the bi-continuous emulsion soak solution the acid Data Summary The drilling fluid was a commercial mud. After hot rolling it for 16 hours at 150° F. (66° C.), the fluid properties were analyzed. In addition, the PSD was determined before and after screening with 325 US Mesh (45 micron) sieves.

The most significant result from the mud analysis was the percentage of low gravity solids and their size. A low gravity content of 14.3% is considered three times the desired level for drilling into a reservoir regardless of the formation permeability. In addition, more than 90% (by volume) of the solids in the system were below 50 μm. These conditions are very susceptible to causing damage and despite the change in the wettability of these solids to a water-wet state, they may still be very damaging. The PSD analysis is shown below.

TABLE I

PARTICLE SIZE DISTRIBUTION OF MUD SOLIDS

| Parameters | Base | Screened Base |
| --- | --- | --- |
| D-50, micron | 20.53 | 19.29 |
| D-10, micron | 4.59 | 4.52 |
| D-90, micron | 58.57 | 49.58 |
| % below 6 micron | 13.5 | 13.7 |

The return permeability test concluded that the formation permeability damage was probably caused by fine solids invasion.

Figure 2:
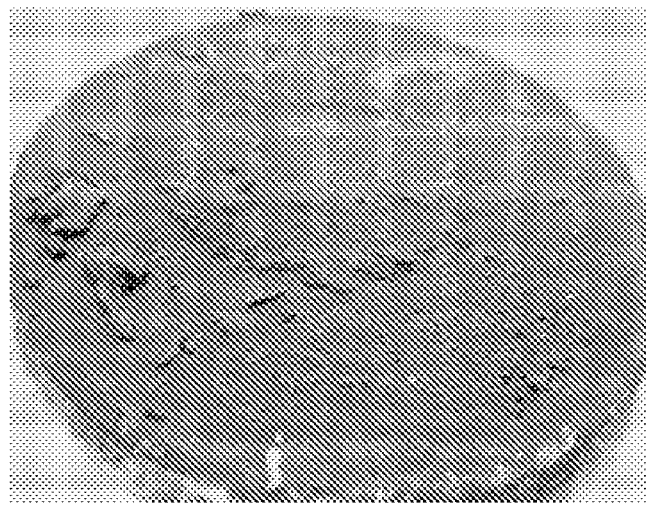
FIG. 2 is a photograph of the remains of the OBM filter cake of FIG. 1 after treatment with a bi-continuous microemulsion as described herein.

Shown in FIG. 1 is a photograph of typical OBM filter cake appearance after mud-off on a 20 μm ceramic disc before soaking with a bi-continuous microemulsion. FIG. 2 is a photograph of the remains of the OBM filter cake of FIG. 1 after treatment with a bi-continuous microemulsion as described herein The solids remaining on the disc in FIG. 2 are water-wet. The soak solution did not contain acid. With acid, the soak solution is capable of breaking the mud emulsion and solubilizing the acid soluble particles.

EXAMPLE 1

Bottle Cleaning Test 10 ml of heavy crude oil (10° API) was placed in a bottle; a photograph of which is shown as FIG. 3B. A photograph of the microemulsion cleaning fluid used in this Example is shown in FIG. 6A, whereas a photograph of the heavy crude oil of FIG. 3A to which the cleaning fluid of FIG. 3A is added is shown in FIG. 3C. The following conclusions were reached:

Total solubilization of the crude oil into the cleaning fluid was observed after only 15 minutes of contact between fluids and without mixing energy.

The solids and surfaces become completely water-wet.

These results are not possible with conventional solvent treatments.

EXAMPLE 2

Cleaning Test In HPHT Cell

The procedure for the Cleaning Test using a high pressure, high temperature (HPHT) cell was as follows:

1. Set up HPHT cell with a ceramic filtration disk (the disk should be saturated with water).
2. Pour in sludge of OBM/crude oil (25/75), close the HPHT cell.
3. Put the cell in a heated jacket at the required temperature, close top and bottom stem valves.
4. Apply a differential pressure of 500 psi (3.4 MPa) in the cell and allow the cell to reach the desired temperature.
5. Open the bottom stem valve of the HPHT cell and collected filtrate for 3 hrs.
6. Close bottom valve and release the pressure on the cell. Pour out excess sludge from the HPHT cell.
7. After the filter cake is deposited, carefully pour the cleaning fluid is into the HPHT cell, being careful not to disturb the integrity of the filter cake.
8. The top of the HPHT cell is engaged, and the cell is placed back into the heated jacket and heated up to the temperature previously used.

9. Apply 100 psi (0.7 MPa) of differential pressure to the cell.
10. Open the bottom stem valve and collect the filtrate.
11. After the filtrate has been collected, close the bottom stem of the HPHT cell.
12. Relieve the pressure from the lines and open the cell.
13. Disassemble the cell and observe the residual filter cake.
14. Check to see if the residual solids are water-wet and dispersible.

The results of the cleaning test of Example 2 are presented in FIG. 4. Photographs of the microemulsion cleaning fluid and the filter cake formed with the sludge are shown at the top of the graph, respectively. Photographs of the fluid collected after cleaning and the filter cake after treatment are shown in the bottom of FIG. 4. The graph is a plot of filtrate volume as a function of time.

These HPHT results demonstrate that the microemulsion treatment fluid works quickly to remove sludge damage, and the results are consistent with the interfacial tension measurements between the crude oil and the cleaning treatment as shown in FIG. 5 at 25° C. and at 85° C.

EXAMPLE 3

FIG. 6A is a photograph of a filter cake formed with sludge from an oil field. FIG. 6B is a photograph of the filter cake of FIG. 6A after treatment with a microemulsion in a HPHT cell in accordance with the procedure of Example 2. FIG. 6C is a photograph of the filter cake of FIG. 6B after the disc had been rinsed with water, demonstrating essentially complete removal of the filter cake from the disc.

EXAMPLE 4

Return Permeability Test

A flow test was run on Berea cores at 150 F (66° C.) using the following procedure:
1.) Saturate the core with 2% KCl.
2.) Measure the initial permeability of the core using 2% KCl.
3.) Inject 5 pore volume of GT-3000 base oil with wetting agent used in OBM into core.
4.) Measure the core permeability to 2% KCl.
5.) Inject 5 pore volume of cleaning fluid.
6.) Measure the final permeability of the core to 2% KCl.
7.) Determine regained permeability.

The initial permeability of the core used in Example 4 was 115 millidarcies (md). The cleaning fluid yielded a regain of 174% permeability which indicates major stimulation was taking place inside the core after injecting the cleaning fluid, as shown by the bar graphs in FIG. 7.

In the foregoing specification, the invention has been described with reference to specific embodiments thereof, and has been suggested as effective in providing effective methods and compositions for removing non-polar materials from subterranean reservoirs and formations. However, it will be evident that various modifications and changes may be made thereto without departing from the broader spirit or scope of the invention as set forth in the appended claims. Accordingly, the specification is to be regarded in an illustrative rather than a restrictive sense. For example, specific combinations of single phase microemulsion-forming components and other components for forming the in situ fluids, such as surfactants, co-surfactants, chelating agents, acids, solvents, non-polar liquids, etc. and proportions thereof falling within the claimed parameters, but not specifically identified or tried in a particular composition to improve the removal of non-polar materials herein, are anticipated to be within the scope of this invention.

The present invention may suitably comprise, consist or consist essentially of the elements disclosed and may be practiced in the absence of an element not disclosed.

The words "comprising" and "comprises" as used throughout the claims is to interpreted "including but not limited to".

What is claimed is:

1. A method of removing at least a portion of wellbore reservoir damage from a subterranean reservoir containing non-polar material, the method comprising:
   pumping a cleaning fluid into the subterranean reservoir to contact the cleaning fluid with the non-polar material in the wellbore reservoir damage, where the cleaning fluid comprises:
      in situ emulsion-forming components comprising:
         at least one surfactant;
         at least one polar fluid;
         a co-solvent or co-surfactant selected from the group consisting of mono or poly-alcohols, organic acids or amines, polyethylene glycol, ethoxylation solvents and mixtures thereof; and
         an acid selected from the group consisting of mineral acids, acetic acid, formic acid, polyamino carboxylic acids, salts of these acids and mixtures thereof;
   forming a single phase microemulsion (SPME, Winsor IV) in situ in the subterranean reservoir, where the in situ-formed SPME is a thermodynamically stable, macroscopically homogeneous mixture of at least three components, where the three components are: a polar phase from the polar fluid, the non-polar material, and the at least one surfactant;
   incorporating at least part of the non-polar material into the single phase microemulsion; and
   removing the single phase microemulsion incorporating the non-polar material from the reservoir damage in the subterranean reservoir.

2. The method of claim 1 where the at least one surfactant is selected from the group consisting of non-ionic surfactants, anionic surfactants, cationic surfactants and amphoteric surfactants, extended surfactants containing a non-ionic spacer-arm central extension and an ionic or nonionic polar group, and mixtures thereof.

3. The method of claim 2 wherein:
   the nonionic surfactants are selected from the group consisting of alkyl polyglycosides, sorbitan esters, methyl glucoside esters, polyglycol esters, and alcohol ethoxylates;
   the anionic surfactants are selected from the group consisting of alkali metal alkyl sulfates, alkyl or alkylaryl sulfonates, linear or branched alkyl ether sulfates and sulfonates, alcohol polypropoxylated sulfates, alcohol polyethoxylated sulfates, alkyl or alkylaryl disulfonates, alkyl disulfates, alkyl sulphosuccinates, alkyl ether sulfates, linear and branched ether sulfates; and
   the cationic surfactants are selected from the group consisting of arginine methyl esters, alkanolamines, and alkylenediamides, extended surfactants with propoxylated or ethoxylated spacer arms, and mixtures thereof.

4. The method of claim 1 where the at least one polar fluid further comprises brine.

5. The method of claim 1 where the in situ emulsion-forming components further comprise a fluid selected from the group consisting of a non-polar fluid and a fluid of intermediate polarity.

6. The method of claim 1 where the cleaning fluid further comprises a component selected from the group consisting of oxidizing agents, water-soluble enzymes, precursors to these components, and combinations thereof.

7. The method of claim 1 where the surfactant in the cleaning fluid is an ionic surfactant.

8. A method of removing at least a portion of wellbore reservoir damage from a subterranean reservoir containing non-polar material, the method comprising:
    pumping a cleaning fluid into the subterranean reservoir to contact the cleaning fluid with the non-polar material in the wellbore reservoir damage, wherein the cleaning fluid comprises:
        in situ emulsion-forming components comprising:
            at least one surfactant; and
            at least one polar brine;
            a co-solvent or co-surfactant selected from the group consisting of mono or poly-alcohols, organic acids or amines, polyethylene glycol, ethoxylation solvents and mixtures thereof; and
            an acid selected from the group consisting of mineral acids, acetic acid, formic acid, polyamino carboxylic acids, salts of these acids and mixtures thereof;
    forming a single phase microemulsion (SPME, Winsor IV) in situ in the subterranean reservoir;
    incorporating at least part of the non-polar material into the single phase microemulsion; and
    removing the single phase microemulsion incorporating the non-polar material from the wellbore reservoir damage in the subterranean reservoir,
    where the in situ-formed SPME is a thermodynamically stable, macroscopically homogeneous mixture of at least three components, where the three components are: a polar phase from the polar brine, the non-polar material, and the at least one surfactant.

9. The method of claim 8 where the at least one surfactant is selected from the group consisting of non-ionic surfactants, anionic surfactants, cationic surfactants and amphoteric surfactants, extended surfactants containing a non-ionic spacer-arm central extension and an ionic or nonionic polar group, and mixtures thereof.

10. The method of claim 9 where in:
    the nonionic surfactants are selected from the group consisting of alkyl polyglycosides, sorbitan esters, methyl glucoside esters, polyglycol esters, and alcohol ethoxylates;
    the anionic surfactants are selected from the group consisting of alkali metal alkyl sulfates, alkyl or alkylaryl sulfonates, linear or branched alkyl ether sulfates and sulfonates, alcohol polypropoxylated sulfates, alcohol polyethoxylated sulfates, alkyl or alkylaryl disulfonates, alkyl disulfates, alkyl sulphosuccinates, alkyl ether sulfates, linear and branched ether sulfates; and
    the cationic surfactants are selected from the group consisting of arginine methyl esters, alkanolamines, and alkylenediamines, extended surfactants with propoxylated or ethoxylated spacer arms, and mixtures thereof.

11. The method of claim 8 where the cleaning fluid further comprises a component selected from the group consisting of oxidizing agents, water-soluble enzymes, precursors to these components, and combinations thereof.

12. The method of claim 8 where the in situ emulsion-forming components further comprise a fluid selected from the group consisting of a non-polar fluid and a fluid of intermediate polarity.

13. The method of claim 8 where the non-polar material is selected from the group consisting of oil-based mud, synthetic-based mud, paraffins, aromatic hydrocarbons, asphaltenes, emulsions, slugs, and combinations thereof.

14. A method of removing at least a portion of wellbore reservoir damage from a subterranean reservoir containing non-polar material, the method comprising:
    pumping a cleaning fluid into the subterranean reservoir to contact the cleaning fluid with the non-polar material in the wellbore reservoir damage, where the cleaning fluid comprises:
        in situ emulsion-forming components comprising:
            at least one surfactant where the at least one surfactant is selected from the group consisting of non-ionic surfactants, anionic surfactants, cationic surfactants and amphoteric surfactants, extended surfactants containing a non-ionic spacer-arm central extension and an ionic or non-ionic polar group, and mixtures thereof;
            at least one polar brine;
            a co-solvent or co-surfactant selected from the group consisting of mono or poly-alcohols, organic acids or amines, polyethylene glycol, ethoxylation solvents and mixtures thereof; and
            an acid selected from the group consisting of mineral acids, acetic acid, formic acid, polyamino carboxylic acids, salts of these acids and mixtures thereof;
            where the non-polar material is selected from the group consisting of oil-based mud, synthetic-based mud, paraffins, aromatic hydrocarbons, asphaltenes, emulsions, slugs, and combinations thereof;
    forming a single phase microemulsion (SPME, Winsor IV) in situ in the subterranean reservoir, where the in situ-formed SPME is a thermodynamically stable, macroscopically homogeneous mixture of at least three components, where the three components are: a polar phase from the polar brine, the non-polar material, and the at least one surfactant;
    incorporating at least part of the non-polar material into the single phase microemulsion; and
    removing the single phase microemulsion incorporating the non-polar material from the wellbore reservoir damage in the subterranean reservoir.

15. The method of claim 14 where the in situ emulsion-forming components further comprise a fluid selected from the group consisting of a non-polar fluid and a fluid of intermediate polarity.

16. The method of claim 14 where the surfactant in the cleaning fluid is an ionic surfactant.

* * * * *